(12) United States Patent
Kirihara (10) Patent No.: US 12,393,297 B2
(45) Date of Patent: Aug. 19, 2025

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Kazuko Kirihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 477 days.

(21) Appl. No.: 17/863,386

(22) Filed: Jul. 12, 2022

(65) Prior Publication Data

US 2023/0305652 A1 Sep. 28, 2023

(30) Foreign Application Priority Data

Mar. 25, 2022 (JP) ................................. 2022-050107

(51) Int. Cl.
*G06F 3/041* (2006.01)
*G06F 3/04817* (2022.01)
*G06F 3/04886* (2022.01)

(52) U.S. Cl.
CPC ........ *G06F 3/0416* (2013.01); *G06F 3/04817* (2013.01); *G06F 3/04886* (2013.01); *G06F 2203/04101* (2013.01)

(58) Field of Classification Search
CPC ............. G06F 3/04842; G06F 3/04886; G06F 3/04817; G06F 3/0416; G06F 2203/04101; H04N 1/00408; H04N 1/00381; H04N 1/00411; H04N 1/00384
See application file for complete search history.

(56) References Cited

U.S. PATENT DOCUMENTS

| 7,697,510 B2 | 4/2010 | Tanimoto |
| 8,446,383 B2 | 5/2013 | Miyazawa et al. |
| 2022/0279077 A1* | 9/2022 | Takai ................... G06F 3/0488 |

FOREIGN PATENT DOCUMENTS

| JP | 2006332889 | 12/2006 |
| JP | 2011170834 | 9/2011 |
| JP | 2014021639 | 2/2014 |
| JP | 2015148960 | 8/2015 |

* cited by examiner

*Primary Examiner* — Yaron Cohen
(74) *Attorney, Agent, or Firm* — JCIPRNET (57) ABSTRACT

An information processing apparatus includes a processor configured to: display a screen including an operation icon on a display; detect an operation object that is brought close to the operation icon while facing the operation icon and is provided for performing a non-contact operation on the operation icon; in a case where the operation object that is brought close to the operation icon while facing the operation icon is continuously detected for an operation confirmation time from a detection start time point at which detection of the operation object that is brought close to the operation icon while facing the operation icon is started, execute a process associated with the operation icon; and change the operation confirmation time in response to a movement of the operation object that is brought close to the operation icon while facing the operation icon.

16 Claims, 7 Drawing Sheets

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2022-050107 filed Mar. 25, 2022.

BACKGROUND

(i) Technical Field

The present invention relates to an information processing apparatus and a non-transitory computer readable medium storing an information processing program.

(ii) Related Art

In the related art, there has been proposed an information processing apparatus capable of a non-contact operation in which an operation on a screen is performed by an operation object such as a finger or a stylus without directly touching the screen.

For example, JP2015-148960A discloses an information processing apparatus that detects an operation object in a spatial region close to a screen for displaying information, specifies an input operation based on a predetermined movement of the detected operation object, and executes a process corresponding to the specified input operation. JP2006-332889A discloses an information processing apparatus that confirms an operation content on a screen by a contact operation, but, prior to the contact operation, detects an operation object close to the screen, predicts an input operation from the movement of the operation object, and starts a process corresponding to the predicted input operation.

SUMMARY

In a non-contact operation, it is not possible to confirm an operation of a user by a clear trigger such as touching of a predetermined position on the screen. Thus, considering a non-contact operation on an operation icon included in the screen, it is conceivable to adopt a method of, in a case where the user brings an operation object such as a finger or a stylus close to the operation icon for a predetermined operation confirmation time, while facing the operation icon, determining that the non-contact operation on the operation icon has been confirmed. An operation that the operation object is close to the operation icon while facing the operation icon means that the operation object is located in a region that faces the operation icon in a space close to the screen and in which a distance from the screen in a perpendicular direction of the screen is within a predetermined distance. In a case where the non-contact operation on the operation icon is confirmed, the information processing apparatus can execute a process associated with the operation icon.

Here, it may be difficult to grasp an accurate operation confirmation time depending on a user who performs a non-contact operation on the operation icon. As a result, the operability of the non-contact operation of the user may deteriorate. For example, even though the user attempts to operate the operation icon with a non-contact operation, the user cancels the close facing to the operation icon of the operation object before the operation confirmation time elapses after the operation object is brought close to the operation icon while facing the operation icon. Thus, the non-contact operation may not be confirmed. Further, even though the user attempts to stop the non-contact operation on the operation icon during the non-contact operation, the operation confirmation time has elapsed before the user cancels the close facing of the operation object to the operation icon, and thus the non-contact operation may be confirmed.

Aspects of non-limiting embodiments of the present disclosure relate to an information processing apparatus and a non-transitory computer readable medium storing a program that improve operability of a non-contact operation by a user in an information processing apparatus that confirms the non-contact operation on an operation icon, as compared to a case where an operation confirmation time is fixed, in a manner that a user brings an operation object close to the operation icon included in a screen for the operation confirmation time while facing the operation icon.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: display a screen including an operation icon on a display unit; detect an operation object that is brought close to the operation icon while facing the operation icon and is provided for performing a non-contact operation on the operation icon; in a case where the operation object that is brought close to the operation icon while facing the operation icon is continuously detected for an operation confirmation time from a detection start time point at which detection of the operation object that is brought close to the operation icon while facing the operation icon is started, execute a process associated with the operation icon; and change the operation confirmation time in response to a movement of the operation object that is brought close to the operation icon while facing the operation icon.

BRIEF DESCRIPTION OF THE DRAWINGS

Exemplary embodiment(s) of the present invention will be described in detail based on the following figures, wherein.

DETAILED DESCRIPTION

Figure 1:
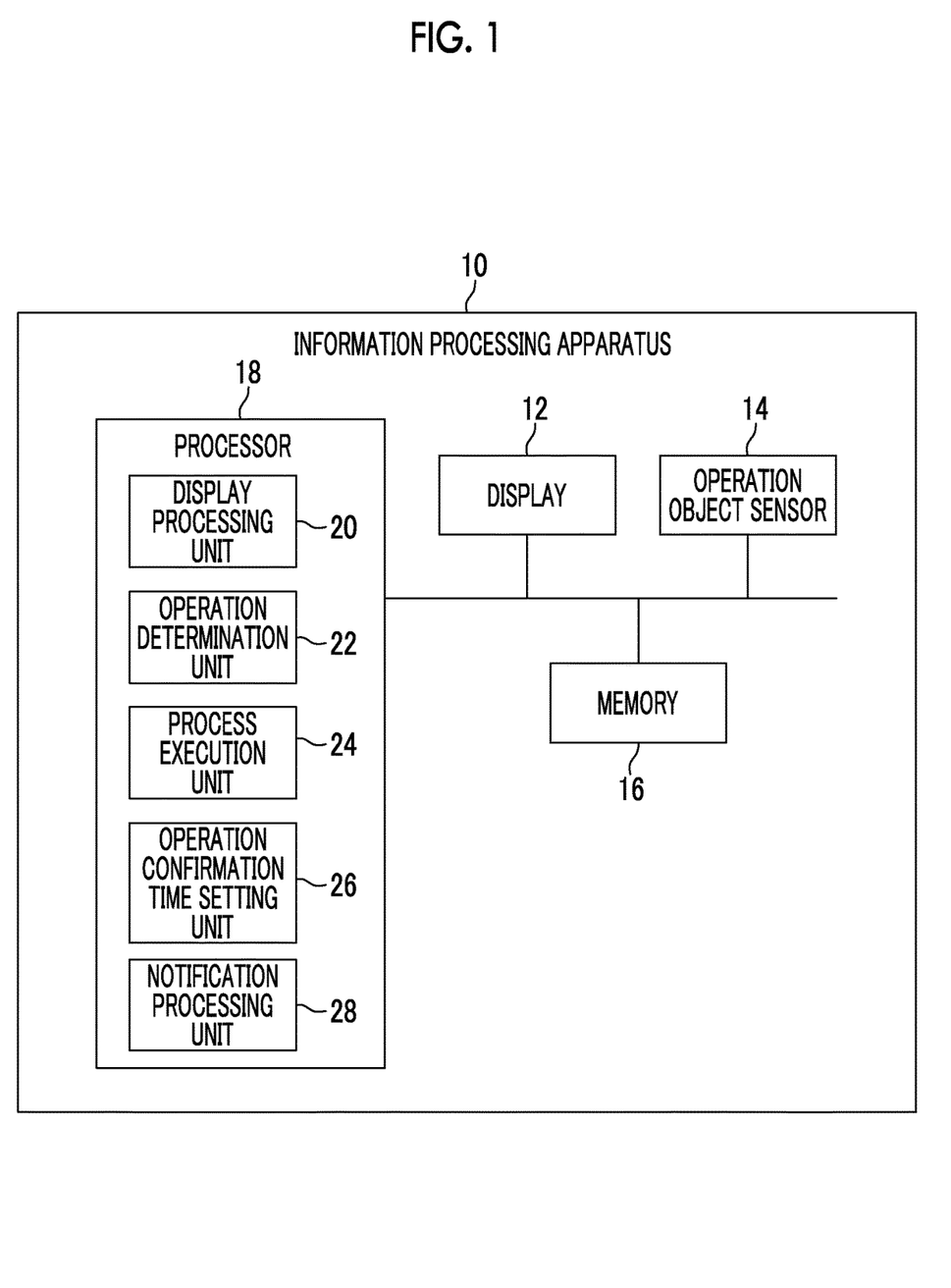
FIG. 1 is a schematic configuration diagram illustrating an information processing apparatus according to a present exemplary embodiment.

FIG. 1 is a schematic diagram illustrating a configuration of an information processing apparatus 10 according to a present exemplary embodiment. As will be described in detail later, the information processing apparatus 10 is an apparatus capable of a non-contact operation. The non-contact operation is to perform an operation on a screen by an operation object without causing the operation object to directly touch an operation panel (the screen displayed on a display in the present exemplary embodiment). The operation object is provided for performing a non-contact operation, for example, a finger of a user or a stylus. The non-contact operation is also called a hover operation.

In the present exemplary embodiment, the information processing apparatus 10 has a print function, a copy function, a scan function, and the like. The information processing apparatus is a multifunction device that executes a print process, a copy process, a scan process, or the like in response to a processing command (job) from the user, but the information processing apparatus 10 is not limited to this. Any apparatus may be used as long as the non-contact operation is possible.

As illustrated in FIG. 1, the information processing apparatus 10 is configured to include a display 12 as a display unit, an operation object sensor 14, a memory 16, and a processor 18. In addition, although not illustrated in FIG. 1, the information processing apparatus 10 may include a communication interface (for example, network interface card (NIC)) that communicates with other devices via a communication line such as a local area network (LAN) and a wide area network (WAN), a contact operation interface (for example, button and touch panel) that receives an instruction from a user by a contact operation, and a processing device (for example, printer and scanner) that executes a printing process and a scanning process.

The display 12 includes, for example, a liquid crystal panel and an organic electro luminescence (EL) panel. Various screens are displayed on the display 12 by the processor 18 (particularly, a display processing unit 20 described later). In particular, the display 12 displays a non-contact operation screen including an operation icon that is a target of the non-contact operation.

The operation object sensor 14 is a sensor that detects an operation object approaching the display 12 (more specifically, a display surface of the display 12). Specifically, the operation object sensor 14 detects the presence or absence of the operation object approaching the display 12 and the position of the operation object which is not in contact with the display 12. The position of the operation object includes a position in a direction of a plane parallel to the display 12 and a position in the perpendicular direction of the display 12.

As a method for detecting the operation object, various known methods can be adopted. For example, the operation object sensor 14 may be an electrostatic capacitance sensor that detects a change in electrostatic capacitance between the display 12 and an operation object. In this case, the processor 18 can detect the presence or absence and the position of the operation object in accordance with the change in electrostatic capacitance between the display 12 and the operation object, which is detected by the operation object sensor 14. Alternatively, the operation object sensor 14 may be an optical sensor that detects light. In this case, infrared rays or laser light is emitted from a light source (not illustrated) in a display surface direction of the display 12, and the operation object sensor 14 detects the reflected light, particularly, the reflected light from the operation object. The processor 18 can detect the presence or absence and the position of the operation object based on the reflected light detected by the operation object sensor 14. In the present specification, the position of the operation object means the position of a portion of the operation object, which is closest to the display 12 (for example, the fingertip or the tip of a stylus).

The detection signal indicating that the operation object has been detected and indicating the position of the detected operation object is transmitted from the operation object sensor 14 to the processor 18.

The memory 16 is configured to include a hard disk drive (HDD), a solid state drive (SSD), an embedded multimedia card (eMMC), a read only memory (ROM), a random access memory (RAM), and the like. The memory 16 stores an information processing program for operating each unit art of the information processing apparatus 10. The information processing program can also be stored in a non-transitory computer readable storage medium such as a universal serial bus (USB) memory or a CD-ROM. The information processing apparatus 10 can read and execute the information processing program from such a storage medium.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

As illustrated in FIG. 1, the processor 18 exhibits functions as a display processing unit 20, an operation determination unit 22, a process execution unit 24, an operation confirmation time setting unit 26, and a notification processing unit 28, in accordance with an information processing program stored in the memory 16.

The display processing unit 20 executes a process of displaying various screens on the display 12. In particular, the display processing unit 20 displays a non-contact operation screen including an operation icon that is a target of the non-contact operation, on the display 12.

Figure 2:
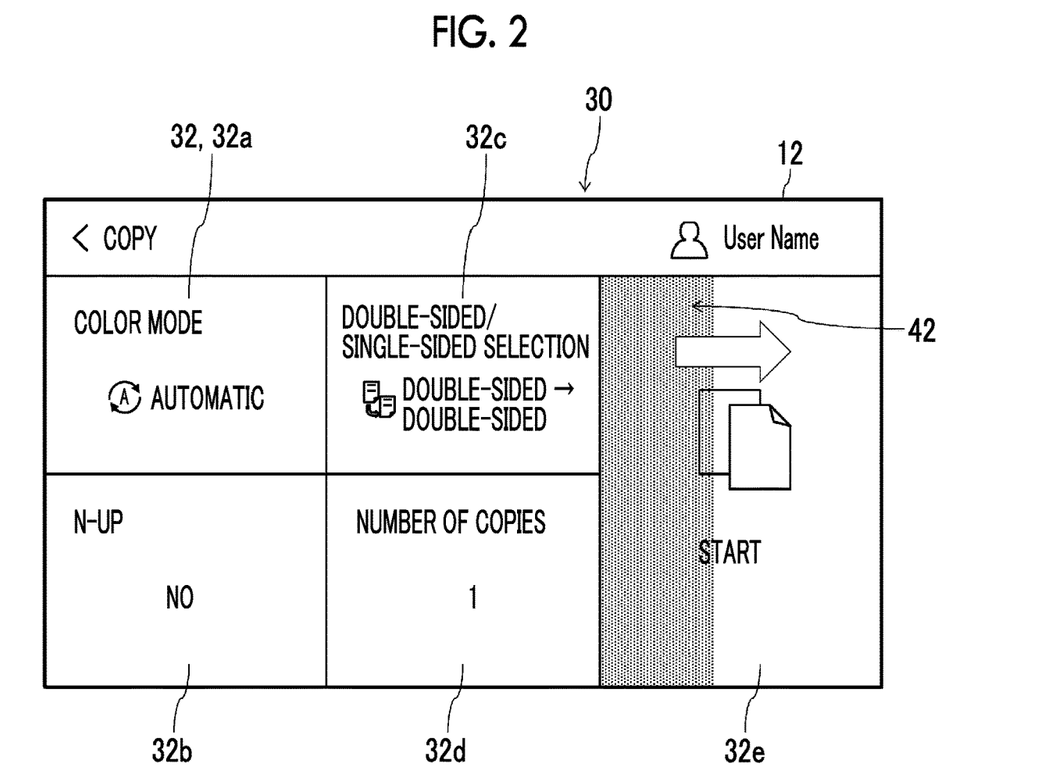
FIG. 2 is a diagram illustrating a first example of a non-contact operation screen.

FIG. 2 is a diagram illustrating a non-contact operation screen 30 displayed on the display 12. The non-contact operation screen 30 includes a plurality of operation icons 32 associated with various processes. Specifically, the non-contact operation screen 30 includes operation icons 32a to 32d for selecting various settings (color mode, double-sided/ single-sided selection, N-up, the number of copies) related to a copying function, and an operation icon 32e for starting a copying process.

The operation determination unit 22 determines whether or not a non-contact operation has been performed on the operation icon 32 displayed on the display 12. Specifically, the operation determination unit 22 detects an operation object that is brought close to the operation icon 32 while facing the operation icon 32, based on the detection signal of the operation object sensor 14. In a case where the operation determination unit 22 detects the operation object that is brought close to the operation icon 32 while facing the operation icon 32, continuously for an operation confirmation time from a detection start time point at which the detection of the operation object is started, the operation determination unit 22 determines that the non-contact operation has been performed on the operation icon 32, that is, that the non-contact operation has been confirmed.

The initial value of the operation confirmation time may be defined in advance by the administrator of the information processing apparatus 10 or the like. As will be described later, the operation confirmation time can be changed by the operation confirmation time setting unit 26.

Figure 3:
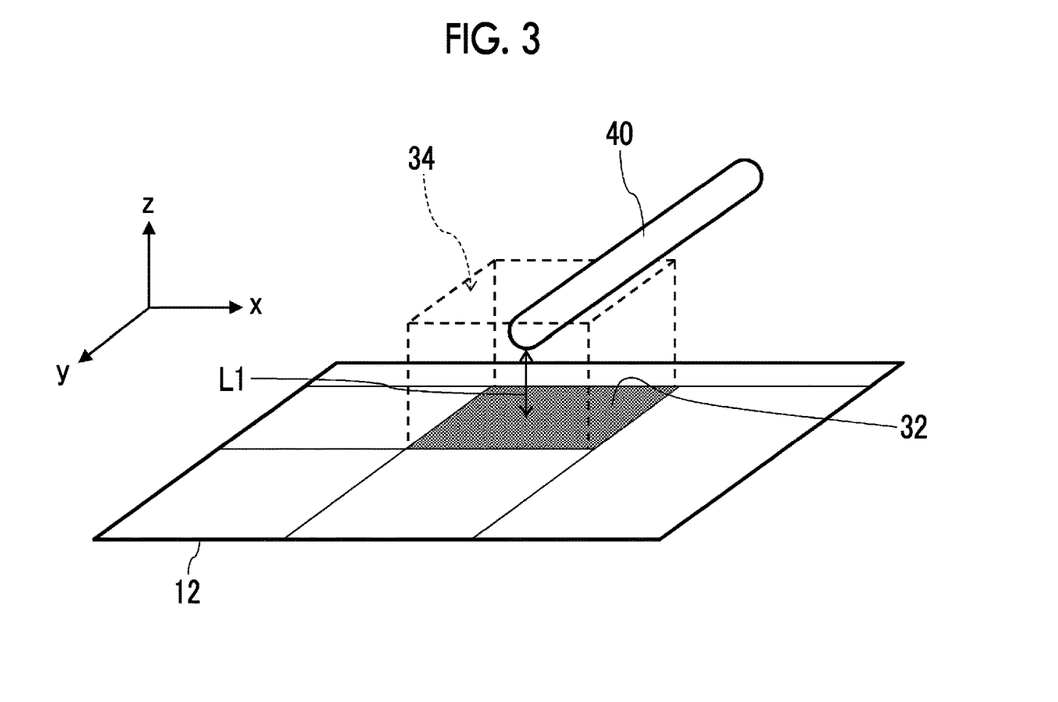
FIG. 3 is a diagram illustrating a close facing region of an operation object and an operation icon.

A process of the operation determination unit 22 will be specifically described with reference to FIG. 3. FIG. 3 is a diagram illustrating an operation object 40 that is brought close to the operation icon 32 while facing the operation icon 32. In FIG. 3 (the same applies to FIGS. 4, 5, and 7), a direction parallel to the display 12 (transverse direction of the display 12) is set as an x-axis, a direction that is parallel to the display 12 and is perpendicular to the x-axis (longitudinal direction of the display 12) is set as a y-axis, and the perpendicular direction of the display 12 is set as a z-axis.

The phrase that the operation object 40 is brought close to the operation icon 32 while facing the operation icon 32 means that at least a portion of the operation object 40 is located in a close facing region 34 of the operation icon 32. The close facing region 34 of the operation icon 32 is a region facing the operation icon 32, that is, a region through which the operation icon 32 passes in a case where the operation icon 32 is moved in parallel in a z-axis direction. Such a close facing region 34 is a region in which a distance from the operation icon 32 in the z-axis direction is within a predetermined distance. The predetermined distance, that is, the length of the close facing region 34 in the z-axis direction may be determined in accordance with the detectable range of the operation object sensor 14. That is, such a predetermined distance may be a detectable distance of the operation object 40 by the operation object sensor 14.

First, in a case where a user brings the operation object 40 close to the display 12, the operation object sensor 14 detects the operation object 40 and transmits a detection signal to the processor 18. The operation determination unit 22 determines whether the operation object 40 is brought close to any operation icon 32 displayed on the display 12 while facing the operation icon 32, based on the position of the operation object 40 indicated by the detection signal from the operation object sensor 14. In a case where the operation object 40 is brought close to the operation icon while facing the operation icon, the operation icon 32 to which the operation object 40 is brought close while facing is specified. Further, the operation determination unit 22 starts measuring the time from a detection start time point at which the operation object 40 that is brought close to the operation icon 32 while facing the operation icon 32 is detected.

After the detection of the operation object 40 that is brought close to the operation icon 32 while facing the operation icon 32 is started, the operation determination unit 22 confirms the position of the detected operation object 40 based on the detection signal from the operation object sensor 14 at unit time intervals. Here, the unit time interval is a minute time interval such as a millisecond order interval. In a case where the detected operation object 40 is continuously brought close to the specified operation icon 32 for an operation confirmation time from the detection start time point while facing the operation icon 32, in other words, in a case where the position of the operation object 40 is within the close facing region 34 of the specified operation icon 32, the operation determination unit 22 determines that a non-contact operation has been performed on such an operation icon 32.

In a case where the detected operation object 40 is no longer brought close to the operation icon 32 while facing the operation icon 32, before the operation confirmation time elapses from the detection start time point, in other words, in a case where the position of the operation object 40 is moved out from the close facing region 34 of the specified operation icon 32, the operation determination unit 22 does not determine that the non-contact operation on the operation icon 32 has been performed, but determines that the non-contact operation has been cancelled. In this case, the time (which has been measured so far) during which the operation object 40 has been brought close to the operation icon 32 while facing the operation icon 32 is reset.

The case where the detected operation object 40 is no longer brought close to the operation icon 32 while facing the operation icon 32 includes a case where the operation object 40 moves in the z-axis direction and moves away from the operation icon 32 to move out from the close facing region 34 and a case where the operation object 40 moves in an xy plane direction to move out from the close facing region 34.

In a case where the operation determination unit 22 starts detecting the operation object 40 that is brought close to the operation icon 32 while facing the operation icon 32, the display processing unit 20 may display, for example, the operation icon 32 to which the operation object 40 is brought close while facing, and the elapsed time to the operation confirmation time on the display 12. Thus, it is possible for the user to grasp that it is possible to bring the operation object 40 close to the target operation icon 32 while facing the target operation icon 32 and to grasp how long the operation confirmation time is to be waited for.

For example, with reference to FIG. 2, in a case where the operation determination unit 22 starts detecting the operation object 40 that is brought close to the operation icon 32e while facing the operation icon 32e, the display processing unit 20 may display, for example, a progress bar 42 that gradually extends from one end (left end in the example of FIG. 2) of the operation icon 32e to the other end (right end in the example of FIG. 2). The extension speed of the progress bar 42 may be, for example, a speed at which the progress bar 42 reaches the other end of the operation icon 32e at during the elapse of the operation confirmation time. The operation icon 32 to which the operation object 40 is brought close while facing and a display form of the elapse of the time to the operation confirmation time are not limited to the above description.

In a case where the operation determination unit 22 determines that the non-contact operation on the operation icon 32 has been performed, the process execution unit 24 executes the process associated with the operation icon 32.

As described above, the initial value of the operation confirmation time for the operation determination unit 22 to determine whether or not the non-contact operation has been performed on the operation icon 32 may be defined to a predetermined time in advance. The operation confirmation time setting unit 26 executes a process of changing the operation confirmation time. In particular, the operation confirmation time setting unit 26 changes the operation confirmation time in response to the movement of the operation object 40 that has been brought close to the operation icon 32 while facing the operation icon 32.

Specifically, the operation confirmation time setting unit 26 changes the operation confirmation time in response to a change in distance between the operation icon 32 and the operation object 40 that has been brought close to the operation icon 32 while facing the operation icon 32, in the perpendicular direction (z-axis direction) of the display 12 within the operation confirmation time from the detection start time point at which the detection of the operation object 40 that is brought close to the operation icon 32 while facing the operation icon 32 is started.

Specifically, in a case where the operation confirmation time setting unit 26 detects that the operation object 40 approaches the operation icon 32, within the operation confirmation time from the detection start time point, the operation confirmation time setting unit 26 shortens the operation confirmation time. A situation in which the operation object 40 approaches the operation icon 32 means that the user attempts to perform a non-contact operation on the operation icon 32 in many cases. Thus, in a case where the operation object 40 approaches the operation icon 32, the operation confirmation time setting unit 26 shortens the operation confirmation time so that the user can confirm the non-contact operation at an early stage.

Figure 4:
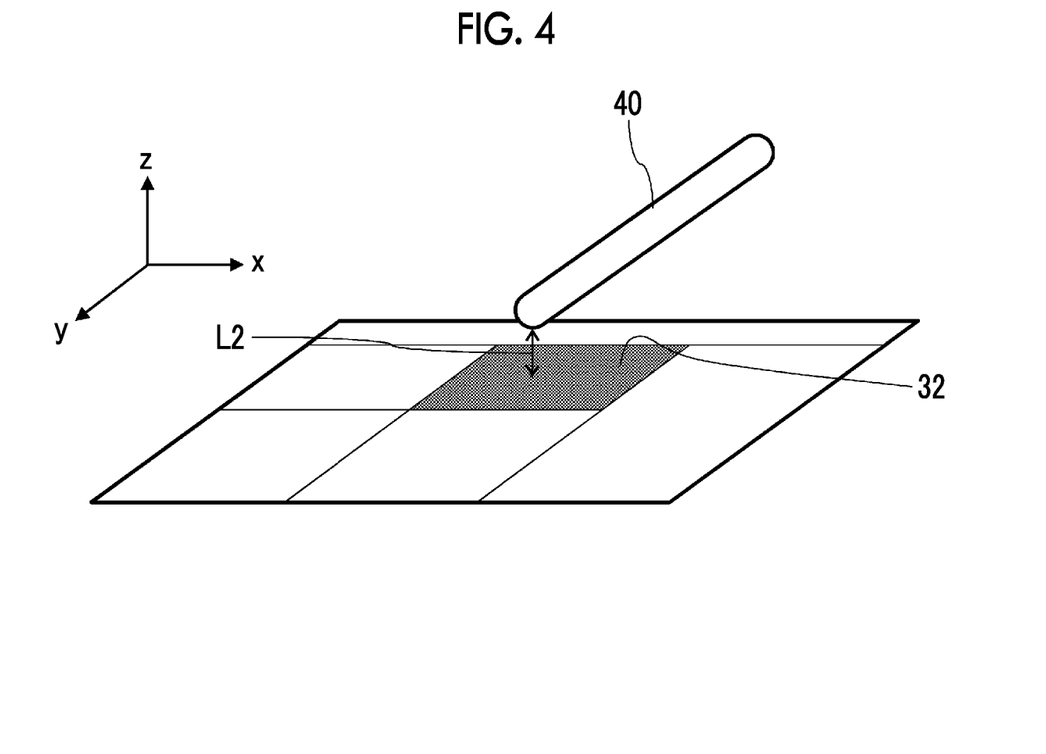
FIG. 4 is a diagram illustrating a state in which the operation object is closer to the operation icon than a state illustrated in FIG. 3.

For example, as illustrated in FIG. 3, a state in which the distance between the operation icon 32 and the operation object 40 (the portion of the operation object 40 closest to the operation icon 32, simply referred to as the operation object 40 below) in the z-axis direction is L1 is considered as a reference. As illustrated in FIG. 4, in a case where the operation object 40 approaches the operation icon 32 and then the distance between the operation object 40 and the operation icon 32 in the z-axis direction becomes L2 (L2<L1) from this state, the operation confirmation time setting unit 26 shortens the operation confirmation time. Specifically, the operation confirmation time setting unit 26 compares the position (L1) of the operation object 40 in the z-axis direction, which has been detected at a first time point (here, time point at which the position of the operation object 40 is the position illustrated in FIG. 3) with the position (L2) of the operation object 40 in the z-axis direction, which has been detected at a second time point (here, time point at which the position of the operation object 40 is the position illustrated in FIG. 4) being a time point after a predetermined movement determination time has elapsed from the first time point. In a case where L2<L1 is established, the operation confirmation time setting unit 26 shortens the operation confirmation time. As described above, in a case where the operation determination unit 22 confirms the position of the operation object 40 at unit time intervals, the movement determination time may be a unit time, but is not necessarily required to be the unit time. For example, the movement determination time may be a time for a plurality of unit times, and the second time point may be a time point after the elapse of a plurality of unit times from the first time point.

Further, in a case where the operation object 40 continues to approach the operation icon 32, the distance between the operation object 40 and the operation icon 32 in the z-axis direction may continuously become shorter than the distance at the previous acquisition time point every time the distance is acquired at the movement determination time intervals. In this case, the operation confirmation time setting unit 26 may gradually shorten the operation confirmation time over a plurality of times. Alternatively, the operation confirmation time setting unit 26 may calculate a difference (L1−L2) between the distance L1 between the operation object 40 and the operation icon 32 at the first time point in the z-axis direction and the distance L2 between the operation object 40 and the operation icon 32 at the second time point in the z-axis direction. Then, in a case where such a difference is more than a threshold distance defined in advance, the operation confirmation time setting unit 26 may shorten the operation confirmation time only once.

Further, in a case where the movement determination time is a considerably short time, for example, in a case where the movement determination time is set as a unit time, it is conceivable that the operation confirmation time is shortened due to the blurring of the operation object 40. In order to suppress an occurrence of a situation in which the operation confirmation time is shortened due to such blurring of the operation object 40, the operation confirmation time setting unit 26 acquires the distance between the operation object 40 and the operation icon 32 in the z-axis direction at least three time points or more at the movement determination time intervals. Then, in a case where such a distance becomes continuously less than the distance at the previous acquisition time point at least two times or more, the operation confirmation time setting unit 26 may shorten the operation confirmation time.

On the contrary, in a case where the operation confirmation time setting unit 26 detects that the operation object 40 becomes farther away from the operation icon 32 within the operation confirmation time from the detection start time point, the operation confirmation time setting unit 26 lengthens the operation confirmation time. A situation in which the operation object 40 becomes farther away from the operation icon 32 means that the user attempts to stop a non-contact operation on this operation icon 32 in many cases. Thus, in a case where the operation object 40 becomes farther away from the operation icon 32, the operation confirmation time setting unit 26 lengthens the operation confirmation time so that it is possible to suppress an occurrence of a situation in which the non-contact operation on the operation icon 32 is confirmed.

Figure 5:
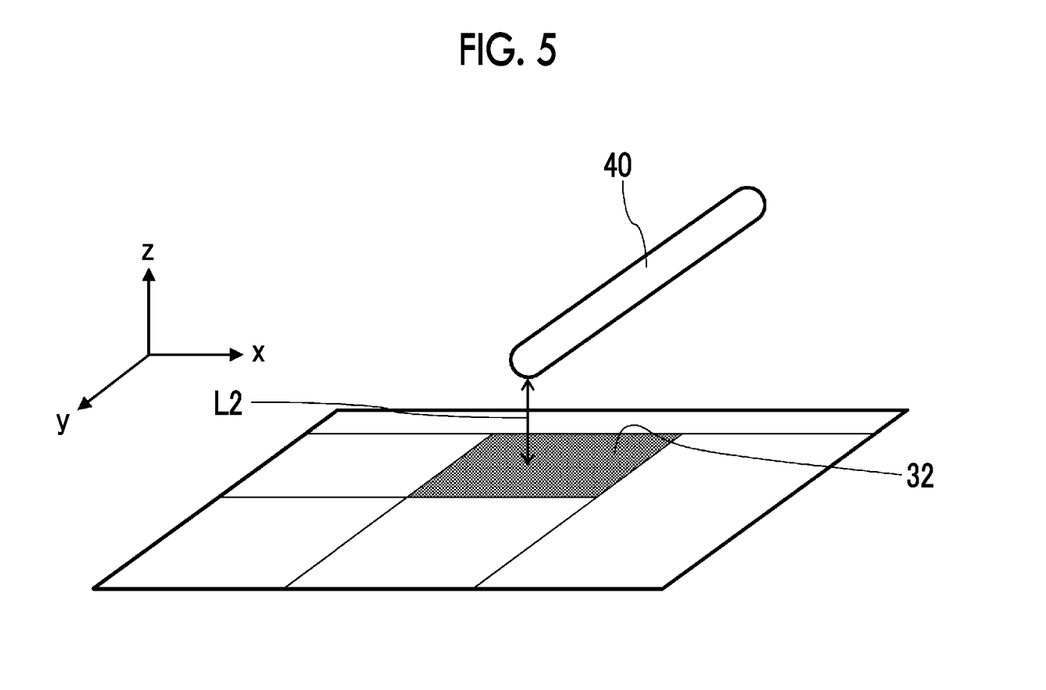
FIG. 5 is a diagram illustrating a state in which the operation object is farther away from the operation icon than the state illustrated in FIG. 3.

Based on the state (see FIG. 3) where the distance between the operation object 40 and the operation icon 32 in the z-axis direction is L1, in a case where, from this state, the operation object 40 becomes farther away from the operation icon 32, and thus the distance between the operation object 40 and the operation icon 32 in the z-axis direction becomes L2 (L1<L2) as illustrated in FIG. 5, the operation confirmation time setting unit 26 lengthens the operation confirmation time. Specifically, the operation confirmation time setting unit 26 compares the position (L1) of the operation object 40 in the z-axis direction, which has been detected at a first time point (here, time point at which the position of the operation object 40 is the position illustrated in FIG. 3) with the position (L2) of the operation object 40 in the z-axis direction, which has been detected at a second time point (here, time point at which the position of the operation object 40 is the position illustrated in FIG. 5) being a time point after a predetermined movement determination time has elapsed from the first time point. In a case where L1<L2 is established, the operation confirmation time setting unit 26 lengthens the operation confirmation time.

Further, in a case where the operation object 40 continuously becomes farther away from the operation icon 32, the distance between the operation object 40 and the operation icon 32 in the z-axis direction may continuously become longer than the distance at the previous acquisition time point every time the distance is acquired at the movement determination time intervals. In this case, the operation confirmation time setting unit 26 may gradually lengthen the operation confirmation time over a plurality of times. Alternatively, the operation confirmation time setting unit 26 may calculate a difference (L2–L1) between the distance L2 between the operation object 40 and the operation icon 32 at the second time point in the z-axis direction and the distance L1 between the operation object 40 and the operation icon 32 at the first time point in the z-axis direction. Then, in a case where such a difference is more than a threshold distance defined in advance, the operation confirmation time setting unit 26 may lengthen the operation confirmation time only once.

Further, in order to suppress the occurrence of a situation in which the operation confirmation time is lengthened due to the blurring of the operation object 40, the operation confirmation time setting unit 26 acquires the distance between the operation object 40 and the operation icon 32 in the z-axis direction at least three time points or more at the movement determination time intervals. Then, in a case where such a distance becomes continuously longer than the distance at the previous acquisition time point at least two times or more, the operation confirmation time setting unit 26 may lengthen the operation confirmation time.

The non-contact operation screen displayed on the display 12 by the display processing unit 20 may include an operation icon associated with a screen transition process for transitioning the screen. For example, a non-contact operation screen 50 as the first screen illustrated in FIG. 6 includes an operation icon 32 associated with the screen transition process. For example, the non-contact operation screen 50 includes an operation icon 32*f* as a first operation icon. In a case where a non-contact operation on the operation icon 32*f* is confirmed, the display processing unit 20 executes the screen transition process of displaying a non-contact operation screen 30 as the second screen illustrated in FIG. 2 on the display 12 instead of the non-contact operation screen 50.

Figure 6:
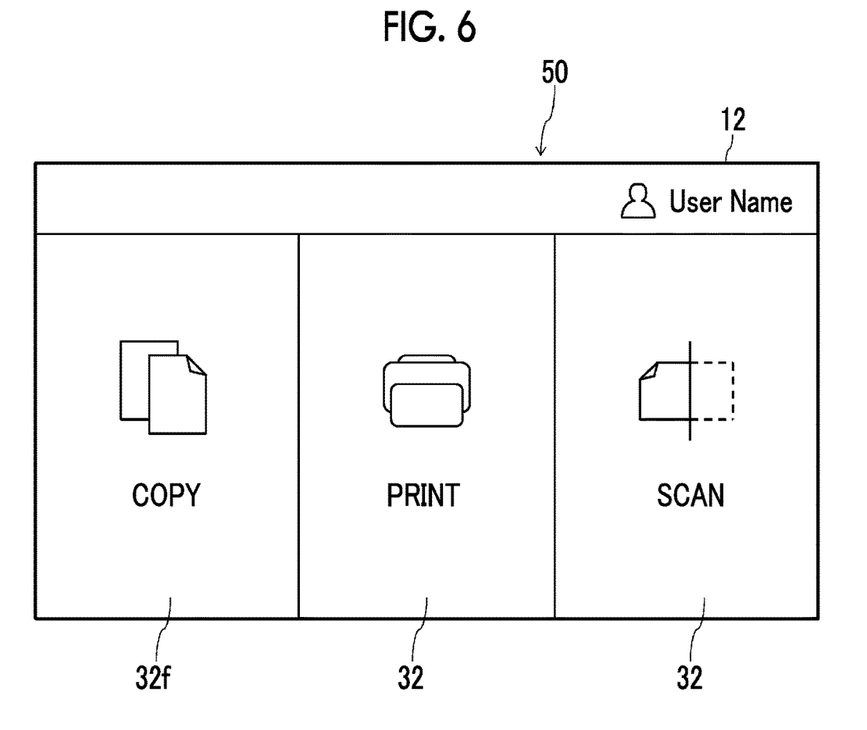
FIG. 6 is a diagram illustrating a second example of the non-contact operation screen.

Here, as can be understood by comparing the non-contact operation screen 30 and the non-contact operation screen 50, the display positions of the operation icons 32*a* and 32*b* as the second operation icon included in the non-contact operation screen 30 overlap the display position of the operation icon 32*f* on the non-contact operation screen 50 (displayed at the identical position). In order to perform the non-contact operation on the operation icon 32*f* on the non-contact operation screen 50, the user brings the operation object 40 close to the operation icon 32*f* while facing the operation icon 32*f*, and holds the operation confirmation time. Then, the non-contact operation on the operation icon 32*f* is confirmed, and the display processing unit 20 displays the non-contact operation screen 30 on the display 12. At this time, since the operation object 40 is in a state of being brought close to a region in which the operation icon 32*f* has been originally displayed, while facing this region, the operation object 40 is in a state of being already brought close to the operation icon 32*a* or 32*b* while facing the operation icon 32*a* or 32*b*, at a display start time point of the non-contact operation screen 30.

In such a case, the user may perform an operation of temporarily separating the operation object 40 from the display 12, for example, in order to check the entirety of the newly displayed non-contact operation screen 30. In a case where such an operation is performed, the operation determination unit 22 detects that the operation object 40 becomes farther away from the operation icon 32*a* or 32*b*. Thus, the operation confirmation time setting unit 26 lengthens the operation confirmation time. In this case, since the user not necessarily attempts to stop the non-contact operation on the operation icon 32*a* or 32*b*, it may not be appropriate to lengthen the operation confirmation time.

In view of this, the operation confirmation time setting unit 26 performs a non-contact operation on the operation icon 32*f* included in the first screen (non-contact operation screen 50 in the above example) displayed on the display 12 before the screen transition process. In a case where the second screen (non-contact operation screen 30 in the above example) is newly displayed as a result, the operation confirmation time setting unit 26 may, for example, not change (not lengthen) the operation confirmation time even in a case where the operation object 40 is already brought close to the operation icon (operation icon 32*a* or 32*b* in the above example) included in the second screen while facing the operation icon, at the display start time point of the second screen, and the operation determination unit 22 detects that the operation object 40 becomes farther away from the operation icon.

Figure 7:
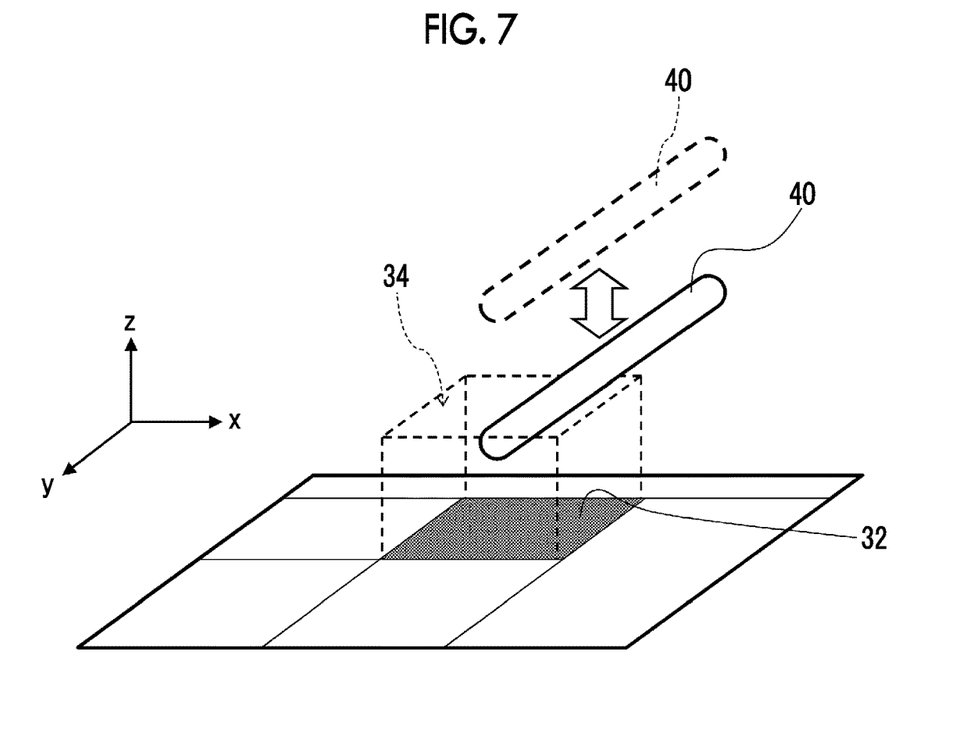
FIG. 7 is a first diagram illustrating a form in which the operation object is moved out from the close facing region.

As illustrated in FIG. 7, a case where the user temporarily moves away the operation object 40, which is brought close to an operation icon 32 while facing the operation icon 32, within the operation confirmation time and then the operation object 40 is brought close to the operation icon 32 again while facing the operation icon 32 is considered. In this case, the user wonders whether to perform the non-contact operation on the operation icon 32, but it is highly possible that the non-contact operation is repeated. In this case, the operation determination unit 22 detects the operation object 40 (the operation object 40 having a portion that has entered into the close facing region 34 of the operation icon 32) that has been brought close to the operation icon 32 while facing the operation icon 32. Then, it is not possible to detect the operation object 40 that is brought close to the operation icon 32 while facing the operation icon 32 (the entirety of the operation object 40 is moved away from the close facing region 34) within the operation confirmation time. Then, the operation determination unit 22 detects again the operation object 40 that has been brought close to the operation icon 32 while facing the operation icon 32.

As described above, after the operation determination unit 22 detects the operation object 40 that has been brought close to the operation icon 32 while facing the operation icon 32, it is not possible to detect the close facing of the operation object 40 to the operation icon 32 within the operation confirmation time. Then, in a case where the operation determination unit 22 detects that the operation object 40 has been brought close to the operation icon 32 while facing the operation icon 32 again, the operation confirmation time setting unit 26 may shorten the operation confirmation time, for example, so that it is possible to confirm the non-contact operation to be performed at an early stage. For example, it is desirable that the operation confirmation time setting unit 26 may shorten the operation confirmation time in a case where it is not possible to detect the close facing of the operation object 40, and then the operation determination unit 22 detects that the operation object 40 has been brought close to the operation icon 32 again while facing the operation icon 32, within a predetermined time. The predetermined time here may be set in advance by the administrator of the information processing apparatus 10 or the like.

A case where the user repeats to move away the operation object 40 that has been brought close to an operation icon 32 while facing the operation icon 32, within the operation confirmation time. In this case, the user may feel that the operation confirmation time is shorter than the actual operation confirmation time, and the operation object 40 may stop close facing to the operation icon 32 without waiting until the actual operation confirmation time in many cases. The user can grasp the elapse of the time until the operation confirmation time by checking the progress bar 42 (see FIG. 2) described above, but the user may not look at the progress bar 42, and the progress bar 42 may not be displayed.

Figure 8:
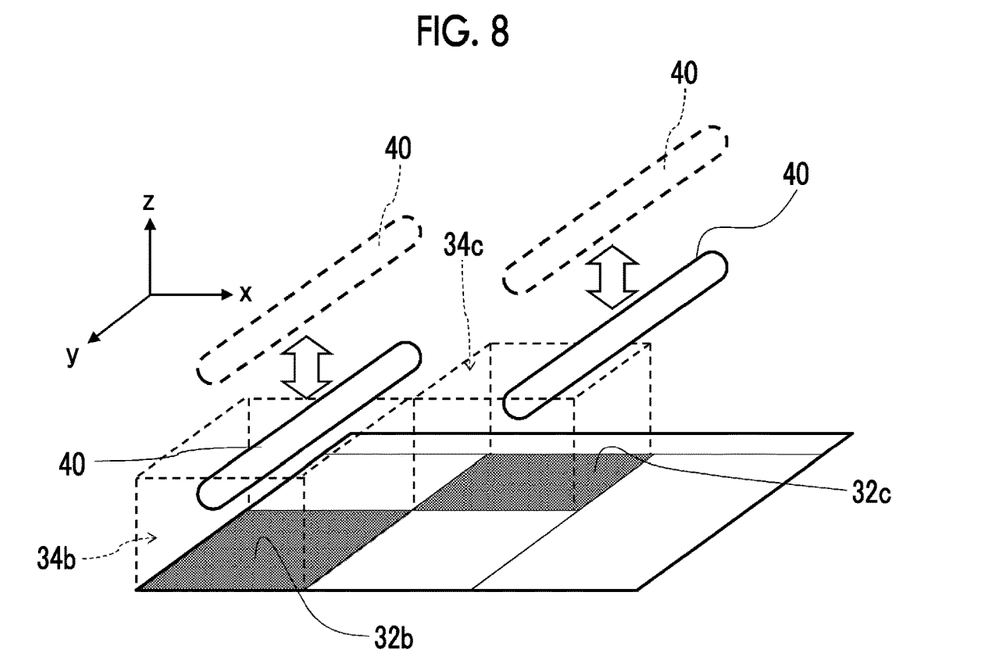
FIG. 8 is a second diagram illustrating the form in which the operation object is moved out from the close facing region.

In particular, as illustrated in FIG. 8, in a case where the user repeats to move away the operation object 40 that has been brought close to a plurality of operation icons 32 while facing the operation icons 32, within the operation confirmation time, more clearly, a tendency that the user feels that the operation confirmation time is shorter than the actual operation confirmation time is strong. In the example of FIG. 8, the operation determination unit 22 detects the operation object 40 which has been brought close to the operation icon 32b while facing the operation icon 32b, and then it does not become possible for the operation determination unit 22 to detect the operation object 40, that is brought close to the operation icon 32b while facing the operation icon 32b, within the operation confirmation time. On the other hand, the operation determination unit 22 detects the operation object 40 which has been brought close to the operation icon 32c while facing the operation icon 32c, and then it does not become possible for the operation determination unit 22 to detect the operation object 40, that is brought close to the operation icon 32c while facing the operation icon 32c, within the operation confirmation time.

Thus, in a case where an occurrence of a situation in which the operation determination unit 22 detects the operation object 40 that is brought close to the operation icon 32 while facing the operation icon 32, and then it is not possible for the operation determination unit 22 to detect the operation object 40 that is brought close to the operation icon 32 while facing the operation icon 32, within the operation confirmation time, repeats a predetermined of number of times, the operation confirmation time setting unit 26 may shorten the operation confirmation time for the user. In particular, in a case where the occurrence of a situation in which, for a plurality of operation icons 32, the operation determination unit 22 detects the operation object 40 which is brought close to the operation icon 32 while facing the operation icon 32, and then it is not possible for the operation determination unit 22 to detect the operation object 40, which is brought close to the operation icon 32 while facing the operation icon 32, within the operation confirmation time repeats, the operation confirmation time setting unit 26 may shorten the operation confirmation time for the user, for example. The predetermined number of times here may be set in advance by the administrator of the information processing apparatus 10 or the like.

As will be described in detail later, the operation confirmation time setting unit 26 associates the user ID for uniquely identifying the user with the operation confirmation time set in response to the non-contact operation (movement of the operation object 40) by the user, and stores this association in the memory 16. In this manner, it is possible to set the operation confirmation time for each user. The operation confirmation time for the user, which is set in this case, may be applied to all the operation icons 32, for example.

A case where, after the user performs a non-contact operation on the operation icon and the display processing unit 20 or the process execution unit 24 executes the processing associated with the operation icon, the information processing apparatus 10 gives an instruction for the user to cancel the process is considered. For example, the user performs a non-contact operation on the operation icon 32f that is included in the non-contact operation screen 50 illustrated in FIG. 6, and is associated with the screen transition process, and the display processing unit 20 displays the non-contact operation screen 30 illustrated in FIG. 2. Then, the user inputs an instruction to display again the non-contact operation screen 50. Alternatively, the user performs a non-contact operation on any of the operation icons 32a to 32d on the non-contact operation screen 30 illustrated in FIG. 2, and the process execution unit 24 changes the setting related to the copy function. Then, the user inputs an instruction to return to the original setting. In this case, the user attempts to stop the non-contact operation on the operation icon 32, but there is a probability that the non-contact operation is confirmed before the operation object 40 is moved out of the close facing region of the operation icon 32. The operation of canceling the process by the user is not limited to the non-contact operation.

Therefore, in a case where the user performs a non-contact operation on the operation icon 32, the display processing unit 20 or the process execution unit 24 executes the processing associated with the operation icon 32, and then reception of an instruction to cancel this process repeats a predetermined number of cancellations, the operation confirmation time setting unit 26 may lengthen the operation confirmation time, for example. As a result, an erroneous non-contact operation on the operation icon 32 by the user is suppressed. In particular, in this case, the user may feel that the operation confirmation time is longer than the actual operation confirmation time. Thus, the operation confirmation time setting unit 26 may lengthen the operation confirmation time for the user. The predetermined number of cancellations here may also be set in advance by the administrator of the information processing apparatus 10 or the like.

The operation confirmation time setting unit 26 may be capable of setting the operation confirmation time for each user who performs a non-contact operation on the operation icon 32, for example. Specifically, the operation confirmation time setting unit 26 associates the user ID for uniquely identifying the user with the operation confirmation time that is set (changed) in response to the non-contact operation (movement of the operation object 40) by the user. Such association is registered in a user DB constructed in the memory 16. The user ID may be obtained by the processor 18 authenticating the user prior to the non-contact operation on the display 12. By referring to the user DB, the operation determination unit 22 is capable of determining whether or not a non-contact operation has been performed on the operation icon 32, based on the operation confirmation time set in accordance with the previous non-contact operation in a case where the next user performs the non-contact operation in the information processing apparatus 10. The user may be able to reset (return to the initial value) the operation confirmation time set at a desired timing. The operation confirmation time setting unit 26 may set the operation confirmation time to be common to all users, not to each user.

In a case where there are a plurality of operation icons 32, the operation confirmation time setting unit 26 can set the operation confirmation time for each operation icon 32. For example, with reference to FIG. 2, the operation confirmation time setting unit 26 can separately set the operation confirmation time for each of the operation icons 32a, 32b, 32c, 32d, and 32e for one user. The operation confirmation time setting unit 26 sets the operation confirmation time for the operation icon 32a according to the movement of the operation object 40 facing and close to the operation icon 32a. The operation confirmation time for each operation icon 32 may be different from each other.

In this case, the operation confirmation time setting unit 26 registers each operation confirmation time for each operation icon 32 for the user ID in the above user DB. In a case where the operation determination unit 22 detects the operation object 40 that is brought close to the operation icon 32 while facing the operation icon 32, the operation determination unit 22 specifies the operation confirmation time set for the user and the operation icon 32 from the user DB, based on the user ID obtained by user authentication and the operation icon 32 facing the operation object 40. Then, the operation determination unit 22 determines whether or not a non-contact operation has been performed on the operation icon 32 based on the specified operation confirmation time. The operation confirmation time setting unit 26 may set a common operation confirmation time for the plurality of operation icons 32.

In a case where the operation confirmation time is set for each operation icon 32, for example, the operation confirmation time for the operation icon 32 associated with a specific process may not be shorter than the predetermined time. The operation icon 32 associated with a specific process is an operation icon 32 for which it is intended to prevent an erroneous operation by the user. For example, as such an operation icon 32, there is an operation icon 32 (for example, the operation icon 32e in FIG. 2) associated with an instruction to start a process of, for example, copying, printing, and scanning, an operation icon 32 associated with a reset instruction to reset settings and the like, an operation icon 32 associated with a logout instruction, or the like. By setting the predetermined time as the initial value of the operation confirmation time, it is possible to prevent the operation confirmation time of the operation icon 32 associated with the specific process from being shortened at all.

The operation confirmation time setting unit 26 may temporarily apply the set operation confirmation time. For example, in a case where the operation confirmation time setting unit 26 changes the operation confirmation time for a certain operation icon 32 by a non-contact operation related to a job input to the information processing apparatus 10 by the user, the operation confirmation time setting unit 26 may save the changed operation confirmation time in the memory 16 until the execution of the job is completed. In a case where the execution of the job has been completed, the operation confirmation time setting unit 26 may delete the saved operation confirmation time from the memory 16. As a result, the operation determination unit 22 determines whether or not a non-contact operation has been performed on the operation icon 32 based on the changed operation confirmation time while the job is being executed. After the job has been completed, the operation determination unit 22 determines whether or not the non-contact operation has been performed on the operation icon 32 based on the operation confirmation time having an initial value. Further, the operation confirmation time setting unit 26 may save the operation confirmation time in the memory 16 until the power of the information processing apparatus 10 is turned off.

In a case where the operation confirmation time is changed by the operation confirmation time setting unit 26, the notification processing unit 28 notifies the user who performs the non-contact operation on the operation icon 32 that the operation confirmation time has been changed. By the notification processing unit 28 performing the notification, it is possible for the user to easily grasp that the operation confirmation time has been changed.

Figure 9:
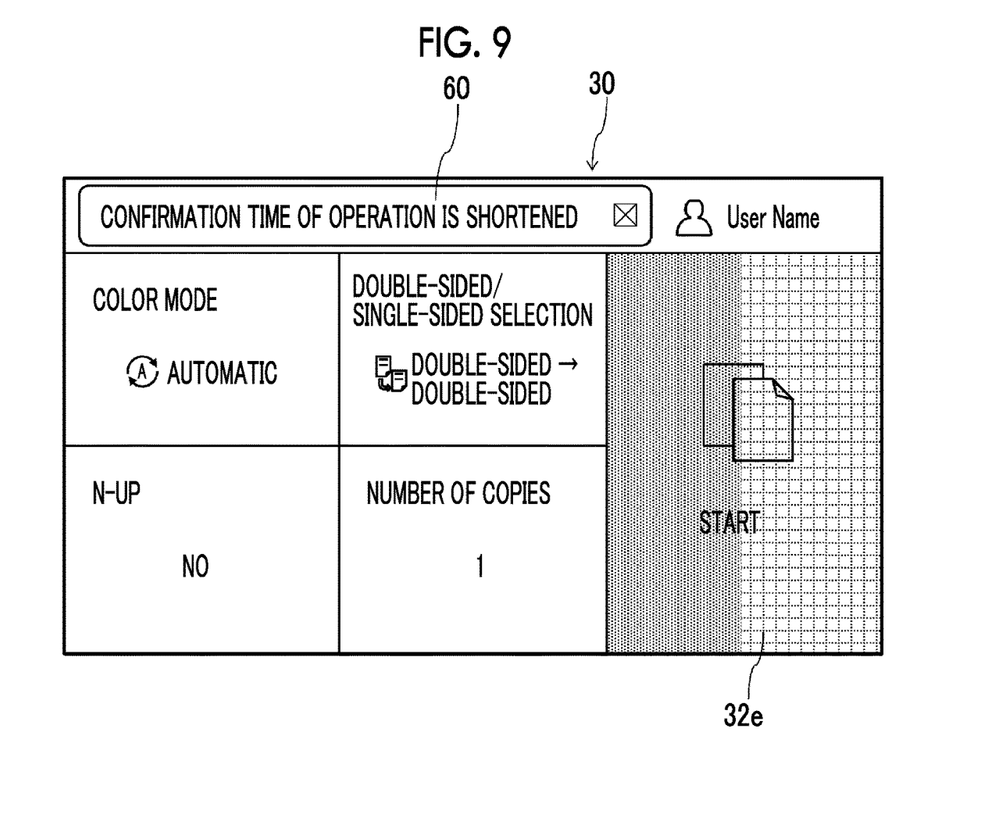
FIG. 9 is a diagram illustrating a third example of the non-contact operation screen.

For example, as illustrated in FIG. 9, the notification processing unit 28 displays a message 60 indicating that the operation confirmation time has been changed on the non-contact operation screen 30. Further, the notification processing unit 28 may display the operation icon 32 to which the operation object 40 is brought close while facing, in a form different from a case where the operation confirmation time is not changed, instead of or in addition to the message 60. For example, in the example of FIG. 9, the notification processing unit 28 displays the color of the operation icon 32e to which the operation object 40 is brought close while facing, with a color different from a color in a case where the operation confirmation time is not changed. The form of notification of the notification processing unit 28 is not limited to the above description. The notification may be given by outputting voice instead of or in addition to the display on the display 12.

In a case where the notification processing unit 28 outputs notifications one by one in a case where the operation confirmation time is changed even a little, this may be troublesome for the user. Therefore, the notification processing unit 28 may notify the user, for example, that the operation confirmation time has been changed, in a case where the operation confirmation time setting unit 26 shortens the operation confirmation time and the changed operation confirmation time is shorter than a first threshold time. Further, the notification processing unit 28 may notify the user, for example, that the operation confirmation time has been changed, in a case where the operation confirmation time setting unit 26 lengthens the operation confirmation time and the changed operation confirmation time is longer than a second threshold time. The first threshold time and the second threshold time here may be set in advance by the administrator of the information processing apparatus 10 or the like.

The configuration of the information processing apparatus 10 according to the present exemplary embodiment is as described above. The flow of processing of the information processing apparatus 10 according to the present exemplary embodiment will be described below with reference to the flowchart illustrated in FIGS. 10 and 11.

Figure 10:
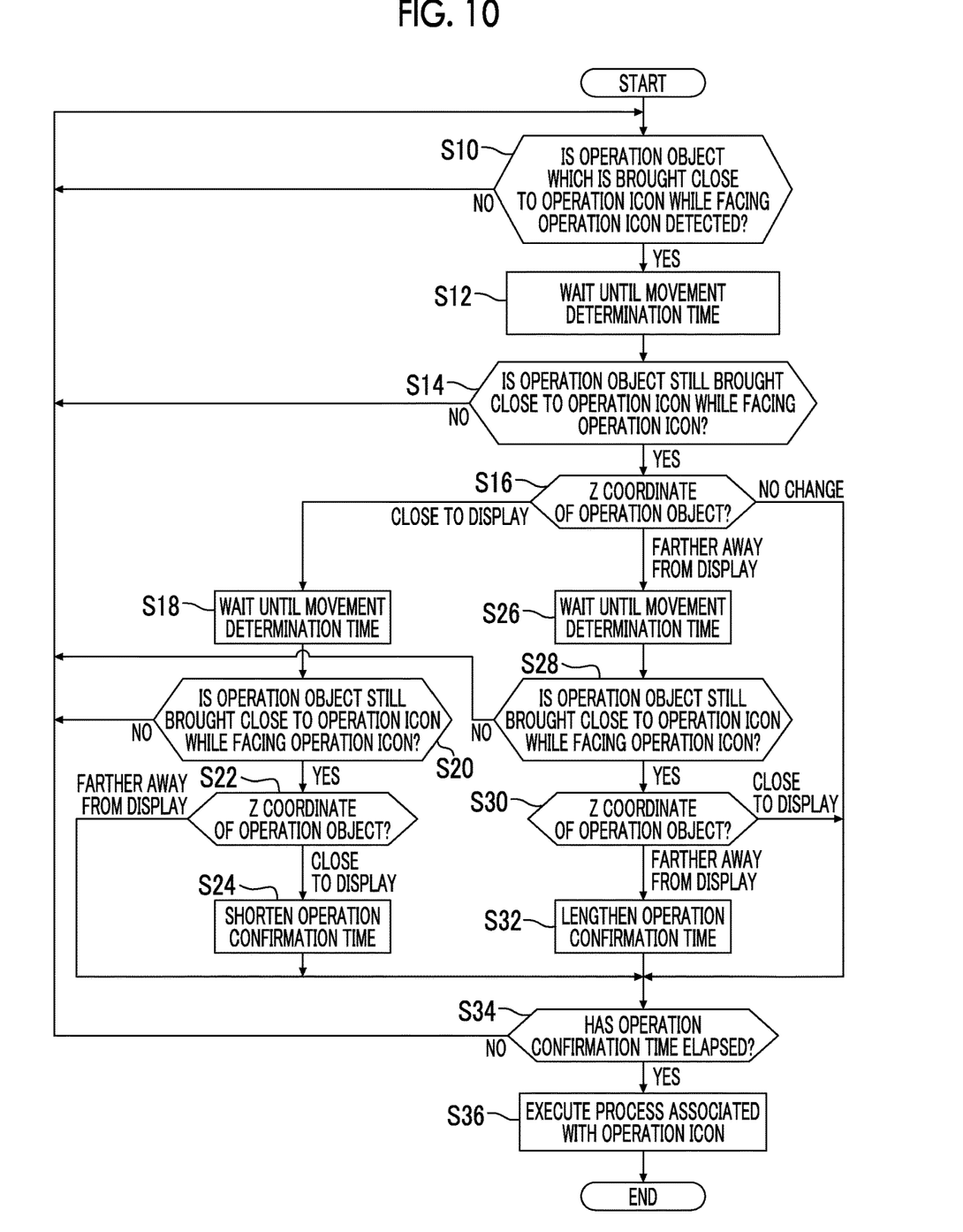
FIG. 10 is a first flowchart illustrating a flow of processing of the information processing apparatus according to the present exemplary embodiment.

FIG. 10 is a flowchart illustrating the flow of processing of changing the operation confirmation time in accordance with the change in the distance between the operation icon 32 and the operation object 40, which has been brought close to the operation icon 32 while facing the operation 32, in the perpendicular direction (z-axis direction) of the display 12.

In Step S10, the operation determination unit 22 determines whether or not the operation object 40 that is brought close to the operation icon 32 while facing the operation icon 32 displayed on the display 12 is detected based on the detection signal from the operation object sensor 14. The operation determination unit 22 waits until the operation determination unit detects the operation object 40 that is brought close to the operation icon 32 while facing the operation icon 32. In a case where the operation determination unit 22 detects the operation object 40, measurement of a time from the detection start time point is started, and the process proceeds to Step S12.

In Step S12, the operation determination unit 22 waits for the above-described movement determination time.

In Step S14, the operation determination unit 22 determines whether or not the operation object 40 detected in Step S10 is still brought close to the operation icon 32 while facing the operation icon 32. In a case where it is not possible to detect that the operation object 40 is brought close to the operation icon 32 while facing the operation icon 32, the process returns to Step S10. In a case where the operation object 40 is still brought close to the operation icon 32 while facing the operation icon 32, the process proceeds to Step S16.

In Step S16, the operation confirmation time setting unit 26 compares the distance L1 between the operation object 40 detected in Step S10 and the display 12 (that is, operation icon 32) in the z-axis direction with the distance L2 between the operation object 40 detected in Step S14 and the display 12 in the z-axis direction. In a case where L2<L1 is established, that is, in a case where the operation object 40 approaches the display 12, the process proceeds to Step S18.

In Step S18, the operation determination unit 22 waits for the movement determination time again.

In Step S20, the operation determination unit 22 again determines whether or not the operation object 40 detected in Steps S10 and S14 is still brought close to the operation icon 32 while facing the operation icon 32. In a case where it is not possible to detect that the operation object 40 is brought close to the operation icon 32 while facing operation icon 32, the process returns to Step S10. In a case where the operation object 40 is still brought close to the operation icon 32 while facing the operation icon 32, the process proceeds to Step S22.

In Step S22, the operation confirmation time setting unit 26 compares the distance L2 between the operation object 40 detected in Step S14 and the display 12 in the z-axis direction with the distance (here, set as L3) between the operation object 40 detected in Step S20 and the display 12 in the z-axis direction. In a case where L3<L2 is established, that is, in a case where the operation object 40 approaches the display 12, the process proceeds to Step S24. In a case where L2<L3 is established, that is, in a case where the operation object 40 becomes farther away from the display, Step S24 is bypassed, and the process proceeds to Step S34.

In Step S24, the operation confirmation time setting unit 26 shortens the operation confirmation time. As described above, in this flowchart, the operation confirmation time setting unit 26 shortens the operation confirmation time in a case where the position of the operation object 40 is acquired three times at the movement determination time intervals, and the operation object 40 approaches the display 12 continuously twice.

In Step S16, in a case where L1<L2 is established, that is, in a case where the operation object 40 becomes farther away from the display 12, the process proceeds to Step S26.

In Step S26, the operation determination unit 22 waits for the movement determination time again.

In Step S28, the operation determination unit 22 again determines whether or not the operation object 40 detected in steps S10 and S14 is still brought close to the operation icon 32 while facing the operation icon 32. In a case where it is not possible to detect that the operation object 40 is brought close to the operation icon 32 while facing the operation icon 32, the process returns to Step S10. In a case where the operation object 40 is still brought close to the operation icon 32 while facing the operation icon 32, the process proceeds to Step S30.

In Step S30, the operation confirmation time setting unit 26 compares the distance L2 between the operation object 40 detected in Step S14 and the display 12 in the z-axis direction with the distance (here, also set as L3) between the operation object 40 detected in Step S28 and the display 12 in the z-axis direction. In a case where L2<L3 is established, that is, in a case where the operation object 40 becomes farther away from the display 12, the process proceeds to Step S32. In a case where L3<L2 is established, that is, in a case where the operation object 40 has approached the display, Step S32 is bypassed, and the process proceeds to Step S34.

In Step S32, the operation confirmation time setting unit 26 lengthens the operation confirmation time. As described above, in this flowchart, the operation confirmation time setting unit 26 lengthens the operation confirmation time in a case where the position of the operation object 40 is acquired three times at the movement determination time intervals, and the operation object 40 becomes farther away from the display 12 continuously twice.

In Step S16, in a case where L1=L2 is established, that is, in a case where there is no change in the position of the operation object 40 in the z-axis direction, the process proceeds to Step S34.

In Step S34, the operation determination unit 22 determines whether or not the operation confirmation time has elapsed from the detection start time point at which the operation object 40 that is brought close to the operation icon while facing the operation icon is first detected in Step S10. In a case where the operation confirmation time has not elapsed, the process returns to Step S10. In a case where the operation confirmation time has elapsed, the process proceeds to Step S36.

In Step S36, the process execution unit 24 executes the process associated with the operation icon 32.

Figure 11:
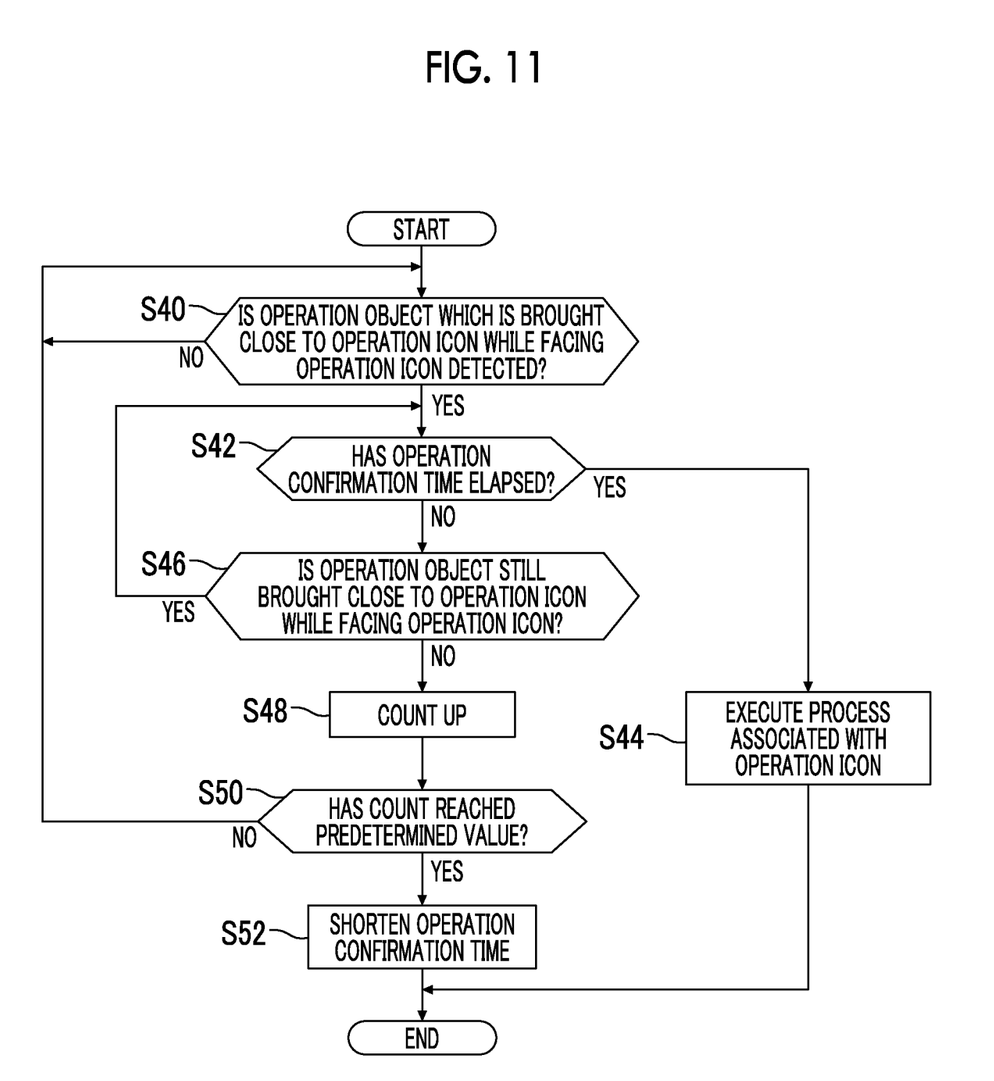
FIG. 11 is a second flowchart illustrating the flow of the processing of the information processing apparatus according to the present exemplary embodiment.

FIG. 11 is a flowchart illustrating the flow of processing of shortening the operation confirmation time in a case where the operation determination unit 22 detects the operation object 40 which has been brought close to the operation icon 32 while facing the operation icon 32, and then a situation in which it is not possible to detect the operation object 40 that has been brought close to the operation icon 32 while facing the operation icon 32, within the operation confirmation time repeats to occur a predetermined of number of times.

In Step S40, the operation determination unit 22 determines whether or not the operation object 40 that is brought close to the operation icon 32 while facing the operation icon 32 displayed on the display 12 is detected based on the detection signal from the operation object sensor 14. The operation determination unit 22 waits until the operation determination unit detects the operation object 40 that is brought close to the operation icon 32 while facing the operation icon 32. In a case where the operation determination unit 22 detects the operation object 40, measurement of a time from the detection start time point is started, and the process proceeds to Step S42.

In Step S42, the operation determination unit 22 determines whether or not the operation confirmation time has elapsed from the detection start time point. In a case where the operation confirmation time has elapsed, the process proceeds to Step S44, and in Step S44, the process execution unit 24 executes the process associated with the operation icon 32 and ends the process. In a case where the operation confirmation time has not elapsed, the process proceeds to Step S46.

In Step S46, the operation determination unit 22 determines whether or not the operation object 40 detected in Step S40 is still brought close to the operation icon 32 while facing the operation icon 32. In a case where the operation object 40 is still brought close to the operation icon 32 while facing the operation icon 32, the process returns to Step S42. In a case where it is not possible to detect that the operation object 40 is brought close to the operation icon 32 while facing the operation icon 32, the process proceeds to Step S48.

In Step S48, the operation confirmation time setting unit 26 increments the count. The count is reset at the start of the flowchart. The count has a value indicating the number of occurrences of a situation in which it is not possible to detect the operation object 40 that has been brought close to the operation icon 32 while facing the operation icon 32, within the operation confirmation time after the operation object 40 that has been close to the operation icon 32 while facing the operation icon 32 is detected.

In Step S50, the operation confirmation time setting unit 26 determines whether or not the count has reached a predetermined value. That is, the operation confirmation time setting unit 26 determines whether or not the number of occurrences of a situation in which it is not possible to detect the operation object 40 that has been brought close to the operation icon 32 while facing the operation icon 32 within the operation confirmation time after the operation object 40 that has been close to the operation icon 32 while facing the operation icon 32 is detected has reached a predetermined number of times. In a case where the count has not reached the predetermined value, the process returns to Step S40. In a case where the count reaches a predetermined value, the process proceeds to Step S52.

In Step S52, the operation confirmation time setting unit 26 shortens the operation confirmation time.

Hitherto, the exemplary embodiment of the present invention has been described, but the exemplary embodiment of the present invention is not limited to the above exemplary embodiment, and various modifications may be made without departing from the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
display a screen including an operation icon on a display unit;
detect an operation object that is brought close to the operation icon while facing the operation icon and is provided for performing a non-contact operation on the operation icon;
in a case where the operation object that is brought close to the operation icon while facing the operation icon is continuously detected for an operation confirmation time from a detection start time point at which detection of the operation object that is brought close to the operation icon while facing the operation icon is started, execute a process associated with the operation icon; and
change the operation confirmation time in response to a movement of the operation object that is brought close to the operation icon while facing the operation icon.

2. The information processing apparatus according to claim 1, wherein the processor is configured to:
change the operation confirmation time in response to a change in a distance between the operation icon and the operation object that is brought close to the operation icon while facing the operation icon, in a perpendicular direction of the screen, within the operation confirmation time from the detection start time point.

3. The information processing apparatus according to claim 2, wherein the processor is configured to:
in a case where it is detected that the operation object approaches the operation icon, within the operation confirmation time from the detection start time point, shorten the operation confirmation time.

4. The information processing apparatus according to claim 2, wherein the processor is configured to:
in a case where it is detected that the operation object becomes farther away from the operation icon, within the operation confirmation time from the detection start time point, lengthen the operation confirmation time.

5. The information processing apparatus according to claim 3, wherein the processor is configured to:
in a case where it is detected that the operation object becomes farther away from the operation icon, within the operation confirmation time from the detection start time point, lengthen the operation confirmation time.

6. The information processing apparatus according to claim 4, wherein the processor is configured to:
in a case where the operation object that is brought close to a first operation icon included in a first screen while facing the first operation icon is continuously detected for the operation confirmation time from the detection start time point, execute a screen transition process of displaying a second screen including a second operation icon located at an identical position to the first operation icon instead of the first screen, and
in a case where the operation object has already been brought close to the second operation icon while facing the second operation icon, at a display start time point of the second screen, not change the operation confirmation time even in a case where it is detected that the operation object becomes farther away from the second operation icon.

7. The information processing apparatus according to claim 5, wherein the processor is configured to:
in a case where the operation object that is brought close to a first operation icon included in a first screen while facing the first operation icon is continuously detected for the operation confirmation time from the detection start time point, execute a screen transition process of displaying a second screen including a second operation icon located at an identical position to the first operation icon instead of the first screen, and
in a case where the operation object has already been brought close to the second operation icon while facing the second operation icon, at a display start time point of the second screen, not change the operation confirmation time even in a case where it is detected that the operation object becomes farther away from the second operation icon.

8. The information processing apparatus according to claim 1, wherein the processor is configured to:
in a case where it is not possible to detect the close facing of the operation object to the operation icon within the operation confirmation time after the operation object that has been brought close to the operation icon while facing the operation icon is detected, and then it is detected again that the operation object is brought close to the operation icon while facing the operation icon, shorten the operation confirmation time.

9. The information processing apparatus according to claim 1, wherein the processor is configured to:
set the operation confirmation time for each user who performs a non-contact operation on the operation icon, and
in a case where a situation in which it is not possible to detect the operation object that is brought close to the operation icon while facing the operation icon, within the operation confirmation time from the detection start time point, repeats to occur a predetermined number of times, shorten the operation confirmation time for the user who has operated the operation object.

10. The information processing apparatus according to claim 1, wherein the processor is configured to:
set the operation confirmation time for each operation icon, and
not shorten the operation confirmation time for the operation icon associated with a specific process in comparison to a predetermined time.

11. The information processing apparatus according to claim 2, wherein the processor is configured to:
set the operation confirmation time for each operation icon, and
not shorten the operation confirmation time for the operation icon associated with a specific process in comparison to a predetermined time.

12. The information processing apparatus according to claim 3, wherein the processor is configured to:
set the operation confirmation time for each operation icon, and
not shorten the operation confirmation time for the operation icon associated with a specific process in comparison to a predetermined time.

13. The information processing apparatus according to claim 8, wherein the processor is configured to:
set the operation confirmation time for each operation icon, and
not shorten the operation confirmation time for the operation icon associated with a specific process in comparison to a predetermined time.

14. The information processing apparatus according to claim 9, wherein the processor is configured to:
set the operation confirmation time for each operation icon, and
not shorten the operation confirmation time for the operation icon associated with a specific process in comparison to a predetermined time.

15. A non-transitory computer readable medium storing an information processing program causing a computer to execute a process comprising:
displaying a screen including an operation icon on a display unit;
detecting an operation object that is brought close to the operation icon while facing the operation icon and is provided for performing a non-contact operation on the operation icon;
executing, in a case where the operation object that is brought close to the operation icon while facing the operation icon is continuously detected for an operation confirmation time from a detection start time point at which detection of the operation object that is brought close to the operation icon while facing the operation icon is started, a process associated with the operation icon; and
changing the operation confirmation time in response to a movement of the operation object that is brought close to the operation icon while facing the operation icon.

16. An information processing apparatus comprising:
means for displaying a screen including an operation icon on a display;
means for detecting an operation object that is brought close to the operation icon while facing the operation icon and is provided for performing a non-contact operation on the operation icon;
means for executing, in a case where the operation object that is brought close to the operation icon while facing the operation icon is continuously detected for an operation confirmation time from a detection start time point at which detection of the operation object that is brought close to the operation icon while facing the operation icon is started, a process associated with the operation icon; and
means for changing the operation confirmation time in response to a movement of the operation object that is brought close to the operation icon while facing the operation icon.

* * * * *